United States Patent
Baughman et al.

(10) Patent No.: US 10,361,924 B2
(45) Date of Patent: Jul. 23, 2019

(54) FORECASTING COMPUTER RESOURCES DEMAND

(71) Applicant: INTERNATIONAL BUSINESS MACHINES CORPORATION, Armonk, NY (US)

(72) Inventors: Aaron K. Baughman, Silver Spring, MD (US); Richard J. Bogdany, Voorheesville, NY (US); Richard A. Locke, Cary, NC (US); Brian M. O'Connell, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1086 days.

(21) Appl. No.: 14/245,640

(22) Filed: Apr. 4, 2014

(65) Prior Publication Data
US 2015/0288571 A1 Oct. 8, 2015

(51) Int. Cl.
*H04L 12/24* (2006.01)

(52) U.S. Cl.
CPC .......... *H04L 41/145* (2013.01); *H04L 41/147* (2013.01); *H04L 41/16* (2013.01)

(58) Field of Classification Search
CPC ...... H04L 41/145; H04L 41/16; H04L 41/147
USPC .......................................................... 703/13
See application file for complete search history.

(56) References Cited

U.S. PATENT DOCUMENTS

| | | | |
|---|---|---|---|
| 6,658,467 B1 * | 12/2003 | Rice | G06Q 30/02 709/219 |
| 6,782,499 B2 | 8/2004 | Osada et al. | |
| 6,792,399 B1 * | 9/2004 | Phillips | G06Q 10/06 705/36 R |
| 7,093,143 B2 | 8/2006 | Ito et al. | |
| 7,141,883 B2 | 11/2006 | Wei et al. | |
| 7,161,828 B2 | 1/2007 | Cummings et al. | |
| 7,254,797 B2 | 8/2007 | Garlepp | |
| 7,996,525 B2 * | 8/2011 | Stienhans | G06F 9/5083 709/224 |
| 8,571,467 B2 | 10/2013 | Uusitalo et al. | |

(Continued)

FOREIGN PATENT DOCUMENTS

| | | |
|---|---|---|
| CA | 2401057 | 9/2001 |
| CN | 102135914 | 7/2011 |

(Continued)

OTHER PUBLICATIONS

Nguyen et al., "AGILE: Elastic Distributed Resource Scaling for Infrastructure-as-a-Service", Jun. 26, 2013, ICAC, pp. 69-82.*

(Continued)

*Primary Examiner* — Juan C Ochoa
(74) *Attorney, Agent, or Firm* — William H. Hartwell; Andrew M. Calderon; Roberts Mlotkowski Safran Cole & Calderon, P.C.

(57) ABSTRACT

An approach for forecasting demand. The approach includes a method that includes receiving one or more variables associated with an event. The method further includes generating, by at least one computing device, a model to forecast future demand based on the one or more variables. The method further includes determining, by the at least one computing device, a load to provision one or more servers to meet the future demand. The load is based on the model.

20 Claims, 8 Drawing Sheets

(56) References Cited

U.S. PATENT DOCUMENTS

| | | | |
|---|---|---|---|
| 8,578,028 | B2 | 11/2013 | Grigsby et al. |
| 8,612,599 | B2 | 12/2013 | Tung et al. |
| 8,621,080 | B2 | 12/2013 | Iyoob et al. |
| 2009/0198559 | A1* | 8/2009 | Wang .................. G06Q 10/087 705/7.31 |
| 2009/0265707 | A1 | 10/2009 | Goodman et al. |
| 2011/0112441 | A1 | 5/2011 | Burdea |
| 2012/0005148 | A1 | 1/2012 | Horvitz et al. |
| 2012/0311657 | A1 | 12/2012 | Boldyrev et al. |
| 2012/0329384 | A1 | 12/2012 | Boldyrev et al. |
| 2013/0073490 | A1 | 3/2013 | Baughman et al. |
| 2013/0086431 | A1 | 4/2013 | Arndt et al. |
| 2013/0219067 | A1 | 8/2013 | Boss et al. |
| 2013/0254374 | A1 | 9/2013 | Bogdany et al. |
| 2013/0263019 | A1 | 10/2013 | Castellanos et al. |
| 2013/0273959 | A1 | 10/2013 | Wu et al. |
| 2013/0275961 | A1 | 10/2013 | Anderson et al. |
| 2013/0290542 | A1 | 10/2013 | Watt et al. |
| 2013/0290598 | A1 | 10/2013 | Fiske et al. |
| 2014/0006377 | A1 | 1/2014 | Astore |
| 2014/0040883 | A1 | 2/2014 | Tompkins |
| 2014/0047272 | A1 | 2/2014 | Bretemitz et al. |
| 2014/0053226 | A1 | 2/2014 | Fadida et al. |
| 2014/0055458 | A1 | 2/2014 | Bogdany et al. |
| 2014/0059226 | A1 | 2/2014 | Messerli et al. |
| 2014/0079297 | A1 | 3/2014 | Tadayon et al. |
| 2014/0165063 | A1 | 6/2014 | Shiva |

FOREIGN PATENT DOCUMENTS

| | | |
|---|---|---|
| CN | 102385719 | 3/2012 |
| CN | 103036974 A | 4/2013 |
| CN | 103095533 A | 5/2013 |
| CN | 103220365 | 7/2013 |
| CN | 103577268 | 2/2014 |
| WO | 2001080158 | 10/2011 |
| WO | 201310262 | 1/2013 |
| WO | 201339555 | 3/2013 |

OTHER PUBLICATIONS

Shen et al., "Cloudscale: elastic resource scaling for multi-tenant cloud systems", 2011, Proceedings of the 2nd ACM Symposium on Cloud Computing, ACM, pp. 1-14.*
Gong et al., "Press: Predictive elastic resource scaling for cloud systems", 2010, International Conference on Network and Service Management (CNSM) IEEE, pp. 9-16.*
Juan Manuel Tirado Martin, Methods to enhance content distribution for very large scale online communities, 2012, PhD. Thesis, Polytechnic school, Carlos III University, pp. i-111.*
Guenter et al., Managing cost, performance, and reliability tradeoffs for energy-aware server provisioning, 2011, Proc. INFOCOM, pp. 702-710.*
Arlitt and Jin, A workload characterization study of the 1998 world cup web site, 2000, IEEE Network, 14(3), pp. 30-37.*
Chen et al., Energy-Aware Server Provisioning and Load Dispatching for Connection-Intensive Internet Services, Apr. 2008, NSDI, vol. 8, pp. 337-350.*
Gustavo Adolfo Campos dos Santos, S-SWAP scale-space based workload analysis and prediction, 2013, Dissertation, Universidade Federal do Ceará, pp. 1-82.*
Lorido-Botrán et al., "Auto-scaling techniques for elastic applications in cloud environments", 2012, Department of Computer Architecture and Technology, University of Basque Country, Tech. Rep. EHU-KAT-IK-09-12, pp. 1-44.*
Moore et al., Transforming reactive auto-scaling into proactive auto-scaling, Apr. 2013, Proceedings of the 3rd International Workshop on Cloud Data and Platforms ACM, pp. 7-12.*
Zhang et al., "Cloud computing: state-of-the-art and research challenges", 2010, Journal of internet services and applications 1.1, pp. 7-18.*
Mell et al., "The NIST definition of cloud computing", 2011, pp. 1-3.*
Barrie Sosinsky, Cloud Computing Bible, Jan. 2011, ISBN 978-0-470-90356-8, pp. 1-532.*
Calheiros et al., "CloudSim: a toolkit for modeling and simulation of cloud computing environments and evaluation of resource provisioning algorithms", 2011, Software: Practice and experience 41.1, pp. 23-50.*
Office Action dated Dec. 4, 2015 in related U.S. Appl. No. 14/247,594, 8 Pages.
Chen et al., "Parameter Selection for Sub-hyper-sphere Support Vector Machine", Department of Computer Science & Technology, Third International Conference on Natural Computation (ICNC 2007), 4 pages.
Lin-cheng Zhou et al., "QPSO-Based Hyper-Parameters Selection for LS-SVM Regression", Fourth International Conference on Natural Computation, 2008 IEEE, 4 pages.
Jeong et al., "Adaptive response mechanism based on the hybrid simulation and optimization for the real time event management", 2009 International Conference on New Trends in Information and Service Science, 6 pages.
Deusen et al.,"The Elements of Nature:Interactive and Realistic Techniques", University of Constance, Germany, Article 32, Jan. 2004. 406 pages.
Abraham et al.,"Survey of Spatio-Temporal Databases", Advanced Computing Research Centre, School of Computer and Information Science, University of South Australia,1999 Kluwer Academic Publishers, Boston, 39 pages.
Ullah et al., "Fuzzy Monte Carlo Simulation using point-cloud-based probability-possibility transformation", The Society for Modeling and Simulation International (SCS), vol. 89 Jul. 2013, 17 pages.
Babu et al.,Recovery and visualization of 3D structure of chromosomes from tomographic reconstruction images, EURASIP Journal of Applied Signal Processing, vol. 2006, Article ID 45684, 13 pages.
Zhou et a.,"Data-Parallel Octrees for Surface Reconstruction", IEEE Transactions on Visualization and Computer Graphics, vol. 17, No. 5, May 2011, 13 pages.
Ruthven et al., "Constructions of dynamic geometry: A study of the interpretative flexibility of educational software in classroom practice", Computers & Education 51, 2008, 21 pages.
Raad et al.,"Achieving Sub-Second Downtimes in Internet-wide Virtual Machine Live Migrations in LISP Networks", IFIP/IEEE International Symposium on Integrated Network Management (IM2013), 8 Pages.
Chen et al.,"Fitting a Surface to 3-D Points Using an Inflating Balloon Model", Institute for Robotics and Intelligent Systems, University of Southern California,1994 IEEE, 8 pages.
Jun Zhu et al., "Twinkle: A Fast Resource Provisioning Mechanism for Internet Services", IEEE INFOCOM, 2011, pp. 802-810.
Sivadon Chaisiri et al., "Optimization of Resource Provisioning Cost in Cloud Computing", IEEE Transactions on Services Computing, Apr.-Jun. 2012, vol. 5, No. 2, pp. 164-177.
Beloglazov et al., "Adaptive Threshold-Based Approach for Energy Efficient Consolidation of Virtual Machines in Cloud Data Centers", Proceedings of the 8th International Workshop on Middleware for Grids, Clouds and e-Science, Nov. 29-Dec. 3, 2010; 6 Pages.
Jain et al., "A Threshold Band Based Model for Automatic Load Balancing in Cloud Environment", Cloud Computing in Emerging Markets (CCEM), 2013, pp. 1-7.
Rak et al., "Cloud-based Concurrent Simulation at Work: Fast Performance Prediction of Parallel Programs", IEEE 21st International WETICE, 2012, pp. 137-142.
Janiesch et al., "Business Activity Management for Service Networks in Cloud Environments", M W4SOC, Dec. 12, 2011; 6 Pages.
Davidson, "Beyond Fun: Serious Games and Media", ETC Press, 2008; 199 Pages.
Bonebakker, "Finding Representative Workloads for Computer System Design", 2007; 292 Pages.
Owayedh, M.S., et al., "Identification of Temperature and Social Events Effects on Weekly Demand Behavior", IEEE, 2000, pp. 2397-2402.

(56) References Cited

OTHER PUBLICATIONS

Weinman, J., Time is money: the value of "on-demand", JoeWeinman. com, Jan. 7, 2011, 30 pages.
Weng. Y., et al., "Price spike forecasting using concept-tree approach based on cloud model", IEEE, 2009, Abstract.
Tirado, J.M., et al., "Predictive Data Grouping and Placement for Cloud-Based Elastic Server Infrastructures", IEEE, 2011, Abstract.
Paris, J.F., et al., "Delayed Chaining: A Practical P2P Solution for Video-on-Demand", IEEE, 2012, Abstract.
Jiu, R., et al., "A predictive judgment method for WLAN attacking based on cloud computing environment", IEEE, 2010, Abstract.
Lagar-Cavilla, HA, et al., "SnowFlock: Virtual Machine Cloning as a First-Class Cloud Primitive", ACM Transactions on Computer Systems (TOCS) Journal, 2011, 51 pages.
Terzis, A .. et al., "Wireless Sensor Networks for Soil Science", International Journal of Sensor Networks, vol. 7, Issue 1/2, Feb. 2010, 18 pages.
Erik Blasch et al., "Information Fusion in a Cloud-Enabled Environment" "Approved for Public Realease; Distribution Unlimited: 88ABW-2013-1114, Mar. 8, 2013", 25 pages.
Bontcheva et al.,"GATECloud.net: a platform for large-sclae,open-source text processing on the cloud" Phil. Trans.R Soc. A 2013371,20120071, Dec. 10, 2012, 14 pages.
Cai et al.,"A Cognitive Platform for Mobile Cloud Gaming", Cloud computing Technology and Science(CloudCom), 2013 IEEE 5th International Conference vol. 1, Publication Year 2013, pp. 72-79.
Georgakopoulos et al.. "Cognitive cloud-oriented wireless networks for the Future Internet"... Wireless Communications and Networking Conference Workshops (WCNCW). 2012 IEEE. pp. 431-435.
Jivanadham, L.B. et al.,"Cloud Cognitive Authenticator (CCA): A public cloud computing authentication mechanism", Informatics, Electronics & Vision (ICIEV), 2013 International Conference on May 17-18, 2013, pp. 1-6.
Wang et al., "Optimizing the cloud platform performance for supporting large-scale cognitive radio networks", Wireless Communications and Networking Conference (WCNC), 2012 IEEE Apr. 1-4, 2012, 3255-3260 pages.
Chun-Hsien et al.,"Cooperative spectrum sensing in TV White Spaces: When Cognitive Radio meets Cloud", Computer Communications Workshops (INFOCOM WKSHPS), 2011 IEEE Conference on Apr. 10-15, 2011, 672-677 pages.
Park et al.,"Cognitive cryptography plugged compression for SSLTLS-based cloud computing services", Journal ACM Transactions on Internet Technology (TOIT), vol. 11 Issue 2, Dec. 2011.
Lewis et al.,"Opportunities in cloud computing for people with cognitive disabilities: designer and user perspective", UAHCI'11 Proceedings of the 6th international conference on Universal access in human-computer interaction: users diversity—vol. Part II pp. 326-331.
Höyhtyä et al.,"Cognitive engine: design aspects for mobile clouds", CogART '11 Proceedings of the 4th International Conference on Cognitive Radio and Advanced Spectrum Management Article No. 32.

* cited by examiner

FORECASTING COMPUTER RESOURCES DEMAND

TECHNICAL FIELD

The present invention generally relates to forecasting demand, and more particularly, to allocating computing resources based on predicted levels of web data traffic.

BACKGROUND

Cloud computing is a web-based processing system which allows for sharing resources, software, and information between different types of computing devices (e.g., laptops, servers, desktop computers, mobile devices, etc.) over the Internet, Intranet, etc. Cloud computing is an evolution of a greater adoption of virtualization, service-orientated architecture systems, and utility computing. As such, users can use cloud computing without having to be experts in the cloud computing technology infrastructure itself.

Furthermore, cloud computing provides a consumption and delivery model for information technology (IT) services based on the Internet and involves over-the-Internet provisioning of scalable and virtualized resources which allows for ease-of-access to remote computing sites. The cloud computing system can utilize web-based tools/applications that users can access and use through a web browser as if the tool/application was installed locally on the user's computing device. Thus, cloud computing systems deliver tools/applications online which can be accessed from another web service or software, e.g., a web browser, while the modules, code, and information to operate the tools/applications are stored on servers instead of on the user's computing device.

SUMMARY

In a first aspect of the invention, a method includes receiving one or more variables associated with an event. The method further includes generating, by at least one computing device, a model to forecast future demand based on the one or more variables. The method further includes determining, by the at least one computing device, a load to provision one or more servers to meet the future demand. The load is based on the model.

In another aspect of the invention, there is a computer program product for predicting demand in a cloud environment. The computer program product includes a computer usable storage medium having program code embodied in the storage medium. The program code is readable/executable by a computing device to receive one or more variables associated with an event. The computer program product includes generating a model to forecast future demand based on the one or more variables being associated with spikes of demand over a period of time. The computer program product includes determining a load based on the model. The load is used to provision one or more servers to meet the future demand, In a further aspect of the invention, a system includes a CPU, a computer readable memory and a computer readable storage medium. The system includes program instructions that are operable to receive one or more variables associated with an event. The one or variables are associated with data demand for at least one of a featured group, participant popularity, playoff prediction, proximity to lead, and web exclusive. Program instructions are operable to generate a model to forecast future demand based on the one or more variables being associated with spikes of demand over a period of time. The model uses a demand factor feature vector. Program instructions are operable to determine a load based on the model. The load is used to provision one or more servers to meet the future demand. The program instructions are stored on the computer readable storage medium for execution by the CPU via the computer readable memory.

In another aspect of the invention, a method for deploying a system for allocating computing resources based on predicted levels of web data traffic in a networked computing environment comprises providing a computer infrastructure being operable to provide the functionality of: receiving one or more variables associated with an event; generating, by at least one computing device, a model to forecast future demand based on the one or more variables; and determining, by the at least one computing device, a load to provision one or more servers to meet the future demand, wherein the load is based on the model.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
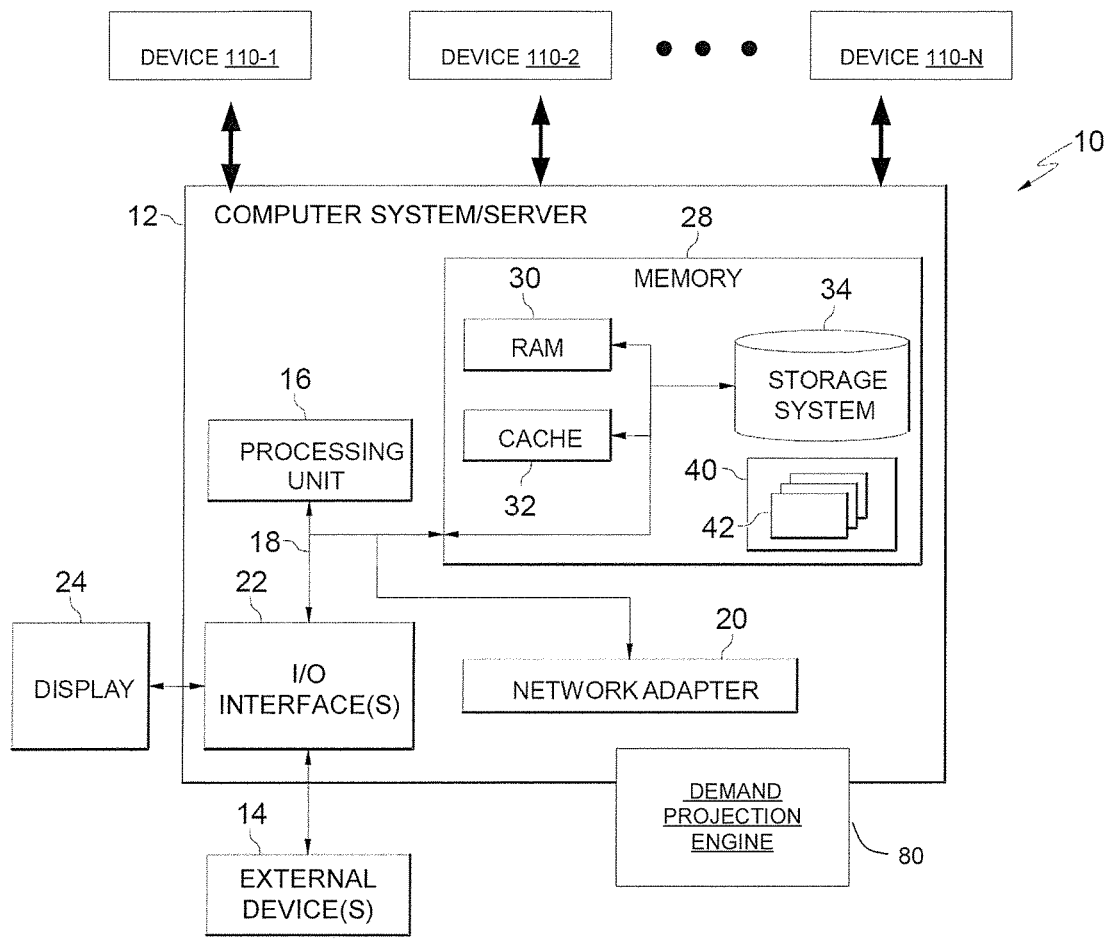
FIG. 1 is an example environment for implementing the steps in accordance with aspects of the present invention.

The present invention generally relates to forecasting demand, and more particularly, to allocating computing resources to predicted levels of web data traffic. In embodiments, the present invention provides for predicting levels of computing resource needed to handle web/data traffic fluctuations that can occur during the event (e.g., a sporting event, a political event, etc.). The present invention contains numerous advantages over manual resource adjustment and previous predictive cloud systems including for example, increased forecasting accuracy and additional features enable enhanced weighting of other features such as social.

In embodiments, the present invention: (i) generates a model (e.g., a linear regression model) that includes multiple variables associated with event-related features; (ii) determines a weight for each of the variables based on the predicted web traffic; (iii) determines predicted web traffic based on the model with each of the weights for each of the variables; and (iv) allocates computing resources (e.g., servers) to meet the predicted web traffic. In embodiments, the present invention determines a computing supply curve which leads to an actual demand curve and followed by a predicted demand curve. In embodiments, the predicted demand curve takes into consideration both cyclical demand and demand spikes that can occur in the future.

In more specific embodiments, the present invention provides predictive cloud provisioning technology which uses different features, e.g., social media conversations, participant popularity, historical data logs, schedule of play, featured portions of the event, web exclusive events, etc., to automatically allocate appropriate levels of computer power to handle future demand. By accurately forecasting the web traffic before and/or during the event, the present invention ensures that a threshold level of computing resources (e.g., 10 servers, 45 servers, 100 servers, etc.) are provisioned and available to meet anticipated web traffic. Accordingly, computing resources (e.g., memory, disk space, processor units, etc.) can be allocated ahead of time to prevent an unsustainable volume of web traffic, and, thus, advantageously, forecast web traffic for a cloud based digital platform delivery system.

In a more specific example, a private continuous availability cloud provides a defined amount of computing resources for a process. The amount of memory, disk space, and processor units are selected and consumed during a particular event. For example, during a golf tournament web traffic can fluctuate based on the demand to follow the tournament at any given time. To this end, the present invention can predict demand at any given time during the tournament or other event, and based on this predicted demand, provide the appropriate computing resources. By way of example, based on social media conversations, player popularity, historical data logs, schedule of play, featured holes, web exclusive events, and playoff possibilities a demand forecast is predicted during the tournament. Predictive cloud provisioning technology automatically allocates the appropriate level of computing power to handle future data demands. The computing supply curve leads the actual demand curve by following a predicted demand curve so that resources are allocated ahead of time to prevent an unsustainable volume of user traffic.

One example of services provided via cloud computing services are sponsored sporting events, such as golf tournaments, tennis tournaments, etc., that use websites that depend on the cloud computing system. These websites can experience large fluctuations in demand based on a variety of factors, including factors relating to the sporting event itself. In instances, cloud instances are statically provisioned for an expected peak for computing resources associated with the sporting event which can result in computing resources wasted during non-peak periods. The present invention addresses such issues.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure including a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16 (e.g., CPU).

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In embodiments, device 110-1, 110-2, . . . , 110-N (hereinafter referred to device 110 in the singular and devices 110 in the plural) can request information/content relating to an event from server 12. Device 110 can be a laptop, desktop computer, smart phone, tablet, and/or any other computing device capable of viewing web page content and/or receiving and sending web page content, textual messages, and/or other types of information from other devices.

In embodiments, device 110 can request information/content for an event (e.g., a live event, such as a golf tournament, a baseball game, etc.) from server 12. For example, device 110 may request information about a particular participant (e.g., statistics—win/loss percentages, points scored, total cash prizes over a period of time, age) who is participating in the event. Multiple devices 110 can request information at the same time from server 12. By tracking the demand of information, demand projection engine 80 can predict future demand and can allocate resources based on the current data/information demand from multiple devices 110 at a given time.

In embodiments, computer system/server 12 includes or communicates with demand projection engine 80 as described in greater detail herein. Program modules 42 generally carry out the functions and/or methodologies of embodiments of the demand projection engine 80 as described herein. For example, some or all of the functions of demand projection engine 80 may be implemented as one or more program modules 42. Additionally, demand projection engine 80 may be implemented as separate dedicated processors or a single or several processors to provide the functionality described herein.

In embodiments, demand projection engine 80 creates a model for projecting demand and then trains (e.g., uses different input values and determines patterns associated with the outputs) the model to provide an output with a threshold level of error (e.g., 2%, 5%, 10%, etc.). In embodiments, the threshold level of error is determined during the training by comparing actual demand with predicted demand. Once the model is trained, demand projection engine 80 then simulates web data traffic demands associated with different characteristics of an event (e.g., for a golf tournament, the scores, popular golf players, etc.). For example, web traffic can be generated by consumers who want information relating to: (i) a particular participant in the event based on their popularity or position within the event; (ii) a particular portion of the event (e.g., a final round of a golf tournament); (iii) a playoff/runoff scenario; and/or (iv) any other feature of the event that can result in a demand for web traffic. Demand projection engine 80 then generates weights based on the predicted web traffic for each of the different characteristics/features; and the weights are then incorporated into a model (e.g., a multi-variable linear regression model). Thus, the model provides an output that is then used to determine the number of servers needed to provide computing resources to meet the projected demand. In embodiments, demand projection engine 80 can send messages, pings, communications, etc., to one or more servers that are part of a cloud computing system.

Figure 2:
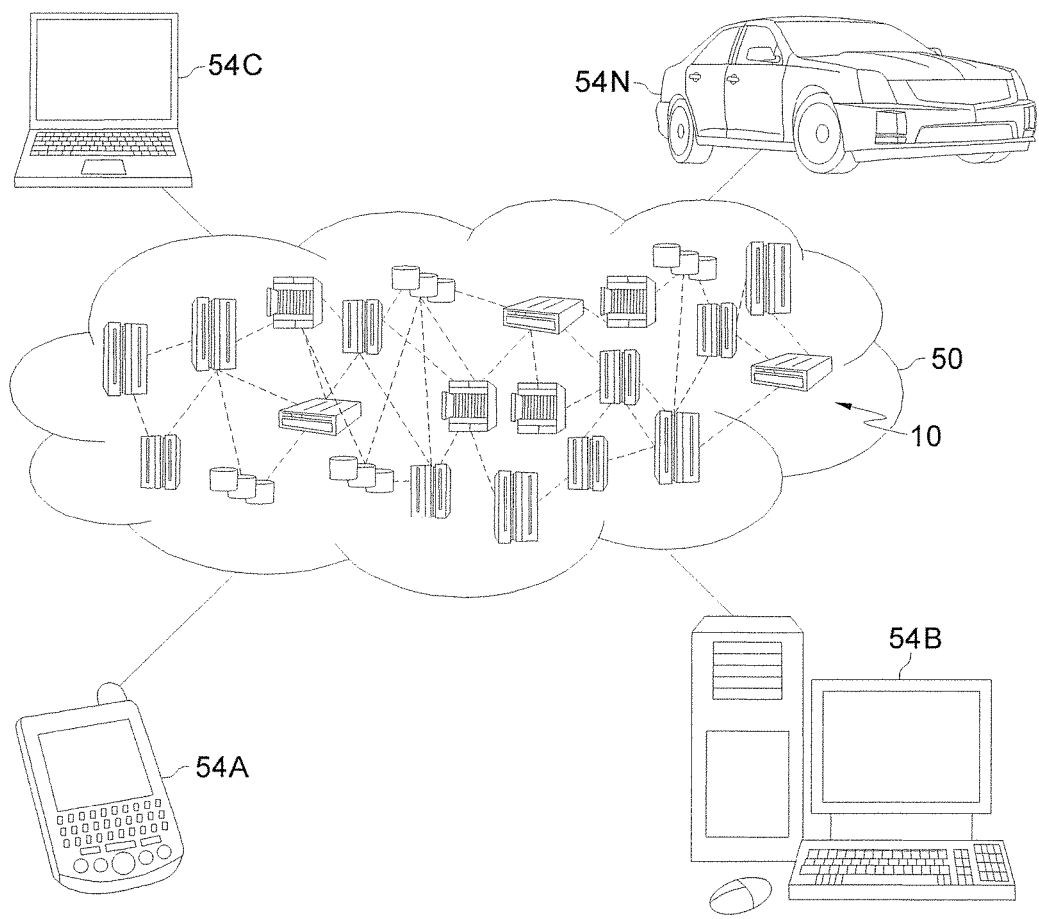
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
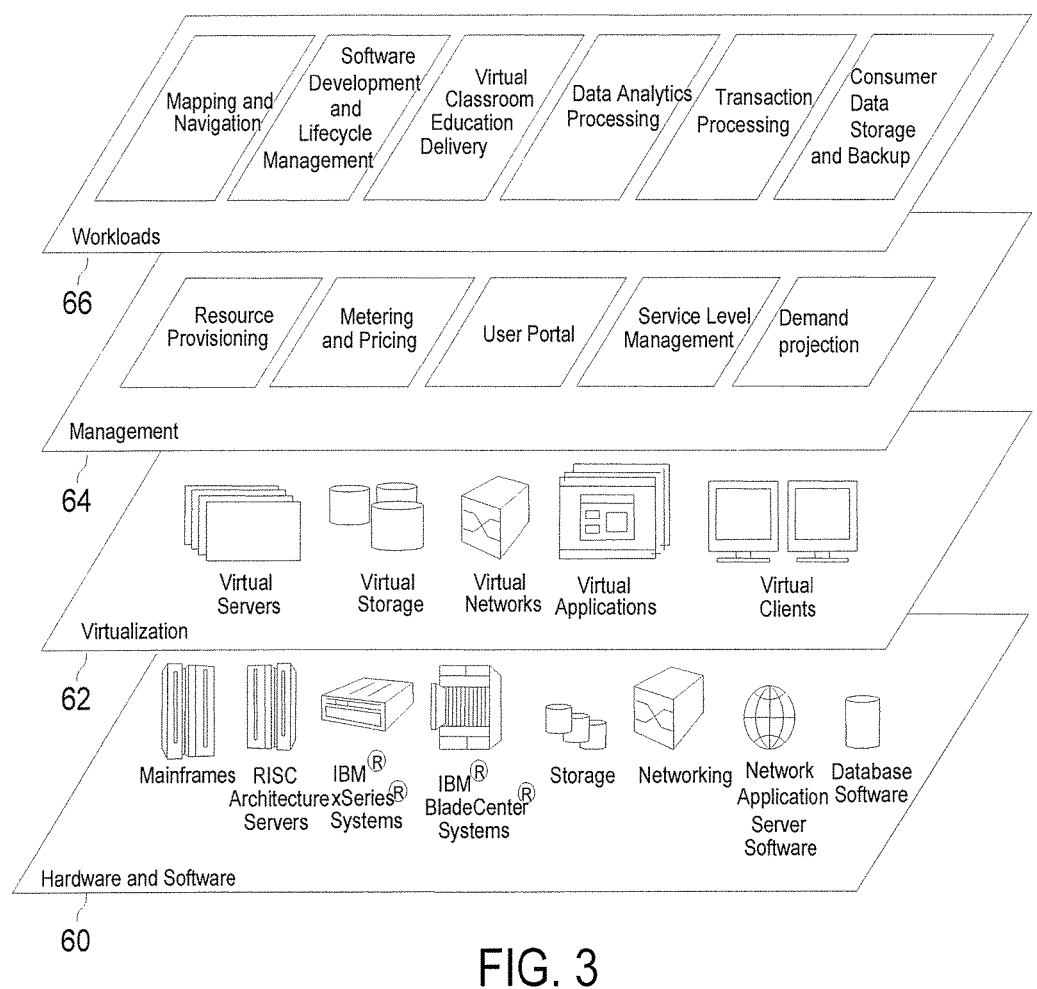
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. In accordance with aspects of the invention, the demand projection workload/function operates to perform one or more of the processes of demand projection engine 80 described herein.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer backup and storage.

As will be appreciated by one skilled in the art, aspects of the present invention, including demand projection engine 80 and the functionality provided therein, may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 4:
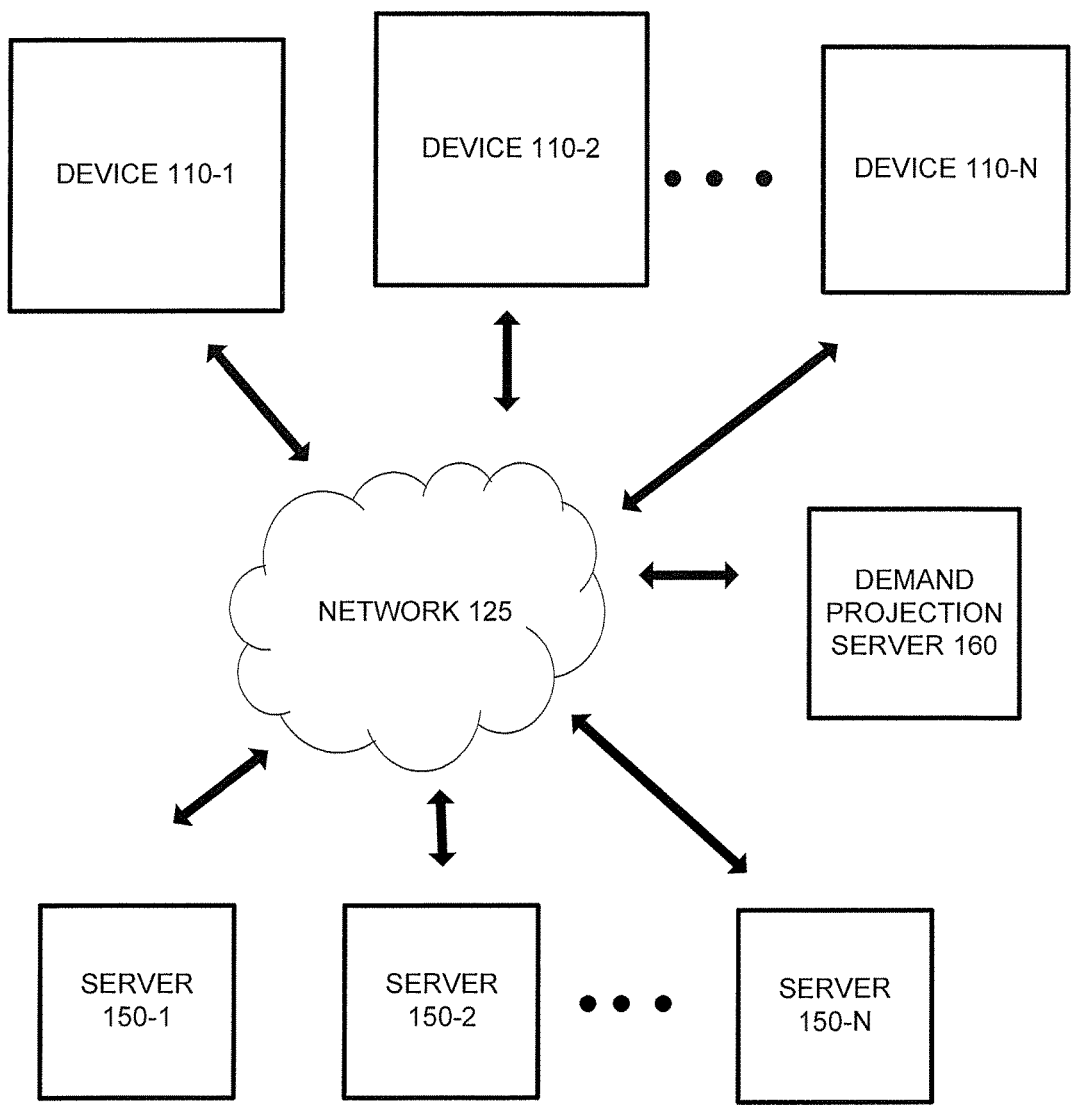
FIG. 4 is an example network diagram in accordance with aspect of the present invention.

FIG. 4 shows an example network diagram in accordance with aspects of the invention. FIG. 4 shows devices 110-1, 110-2, . . . , 110-N (hereinafter referred to as device 110 in the singular and devices 110 in the plural), network 125, servers 150-1, 150-2, . . . , 150-N (hereinafter referred to as server 150 in the singular and servers 150 in the plural) and demand projection server 160. While FIG. 4 shows a particular quantity of each type of device and/or network, there may be additional or fewer devices, servers, and/or networks.

In this example, devices 110 may include any computation or communication device that is capable of communicating with a network (e.g., network 125). For example, devices 110 can be a laptop, desktop computer, smart phone, tablet, or any other type of computing device. Accordingly, devices 110 can receive and/or display content, which can include, for example, objects, data, images, audio, video, text, and/or links to files accessible via one or more networks. Devices 110 can request content/information from servers 150 regarding a particular event (e.g., a sporting event, a political event, a charitable event, etc.).

Network 125 may include one or more networks that allow for communication between different devices (e.g., devices 110, servers 150, demand projection server 160, etc.). In embodiments, network 125 can comprise an Internet, Intranet, local area network (LAN), wide area network (WAN), a GPS network, radio access network, a wireless fidelity (Wi-Fi) network, a Worldwide Interoperability for Microwave Access (WiMAX) network, a cellular network, and/or a combination of these or other networks.

Demand projection server 160 can include one or more computational devices that can allocate the computing resources (e.g., memory, processing units, etc.) associated with servers 150 to meet the predicted demand for content/information from devices 110, as described in FIG. 1, based on current demands from devices 110 as well as historical information. In embodiments, demand projection server 160 predicts future demand and the sends a message to provision a particular number of servers 150 which can be one or more computational devices that provide processing services to a cloud computing system. Thus, demand projection server 160 is able to allocate a number of servers 150 to meet the web traffic demand.

Figure 5:
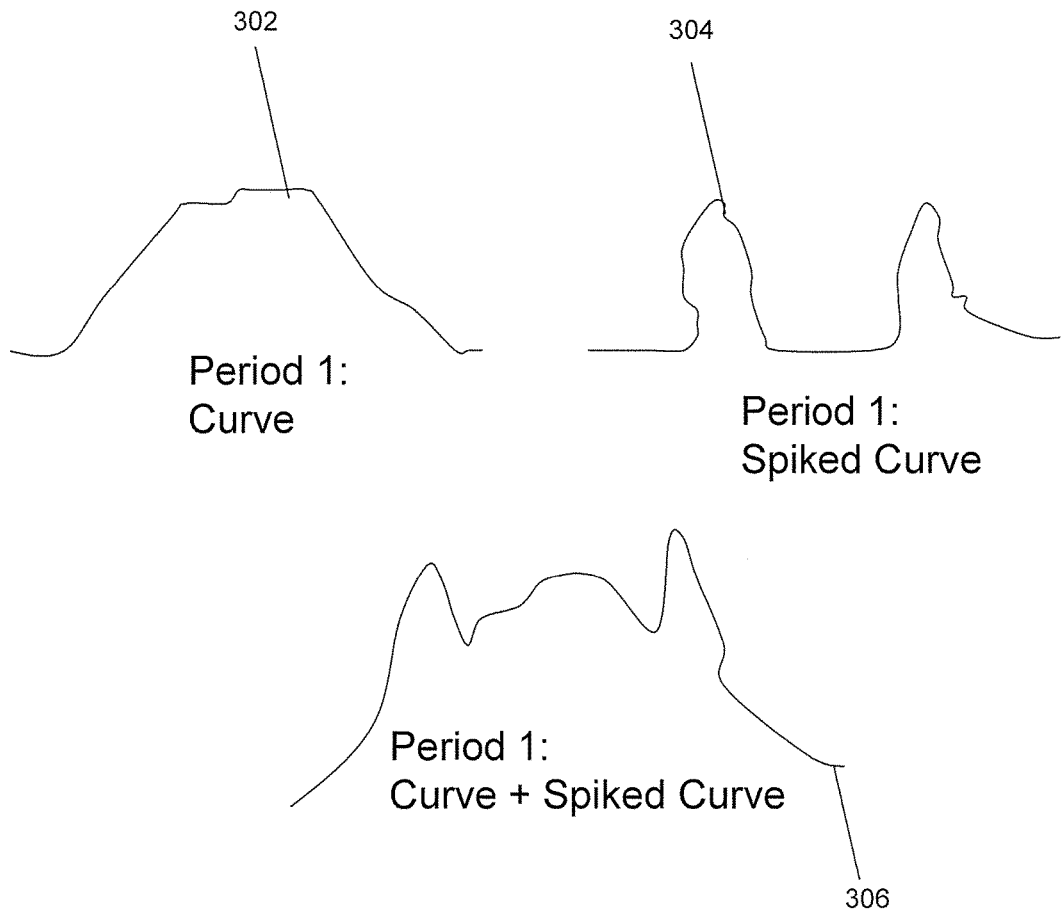
FIG. 5 is an example graphical display of demand in accordance with aspects of the present invention.

FIG. 5 shows example demand curves in accordance with aspects of the present invention. FIG. 5 shows curve 302, curve 304, and curve 306. In embodiments, curve 302 shows a cyclical demand curve for information that is gradual over time. In embodiments, a cyclical demand curve can be based on a maximum, minimum, average, log, natural log, and/or any other type of demand forecast. In embodiments, curve 304 shows a spike demand curve that results in bursts of demand that occur intermittingly over a period of time and then is reduced to a different level of demand during other times. In embodiments, curve 304 can have a maximum value which occurs over a shorter period time than the time period for curve 302; and curve 304 can have a maximum value that is greater, equal, or less than the maximum value of curve 302. For example, between 10:00 a.m. to 10:15 a.m., there is a data demand for 10 megabytes (MB) of information and then only 1 MB of demand for information from 10:15 a.m. until 3:00 p.m. At 3:00 p.m., there is another data demand for 15 MB of information. In embodiments, curve 306 shows a demand curve that includes both a constant demand as shown in curve 302 and bursts of demand as shown in curve 304. Thus, the demand server determines computing device resources based on curve 306.

By way of example, a number of factors can be used to describe a burst event associated with a spike in demand for information, such as: (i) a featured group which are players that have web accessibility streaming coverage of golf play with players within the group having been chosen as fan favorites; (ii) featured holes, such as an amen corner that consists of selected portions of a golf course (e.g., sixth hole, eighth hole, fourteenth hole, etc.) that can determine the outcome of a game; (iii) player popularity which is associated with how many users watch and download information about a particular player in the golf tournament; (iv) playoff prediction which determines if a playoff is needed between playing golfers, current golfers, and those who have finished and the associated data demand for if the playoff does occur; (v) proximity to lead which determines the demand of the event when several players are within range of the winner's circle and/or scores are used to predict using historical information about who will win; and (vi) web exclusive which determines the demand based on those portions of the golf tournament that are only available online.

The demand curve has irregular spikes that coincide with major playing matches or rounds. An event forecaster adds spikes to the predicted curve for short burst periods. An event generator simulates a game tournament into the future time line. During the simulation, sporting matches or other events are accumulated and passed to a feature extraction analytic pipeline as described in more detail below. The feature extraction process discovers numerical representations or factors about the burst event.

In a more specific example, during a particular sporting event, i.e., golf, the following factors describe the burst event:

1) Featured Group, $hits_{FeaturedGroup}(.)$, are players that have web accessible streaming coverage of golf play. The players within the group have been chosen as fan favorites that generally draw high demand.

2) Featured Holes, $hits_{FeaturedHoles}(.)$, are select portions of the golf course that are game differentiators. The factor provides an additional prediction with respect to user demand.

3) Player Popularity, $hits_{PlayerPopularity}(.)$, is the degree in which golf fans want to follow and watch a particular player. Social sentiment from Twitter® (Twitter is a registered mark in the U.S. of Twitter, Inc.) and other sites scales the player popularity.

4) Playoff Prediction, $hits_{Playoff}(.)$, term determines if a playoff is possible. A playoff is determined if both currently playing golfers, current golfers, and those that have finished, club house golfers, could possibly tie. The predicted range for the players that are still playing includes an Eagle to a Double Bogey. If a playoff is likely to occur, the predicted future demand is increased.

5) Proximity to Lead, $hits_{Lead}(.)$, term determines the demand of the event when several players are within range of the winner's circle. If the round has not been completed, scores are predicted from historical game play information until all players have 18 scores. Standard statistics provide likely groups of players that could be a winner.

6) Web Exclusive, $hits_{WebExclusive}(.)$, portions of the golf tournament are only available through the cloud. As a result, the predictor variable encodes how much user volume will change when a web exclusive event occurs.

It should be understood by those of skill in the art, though, that the above features 1)-6) are provided as examples only, and that other factor can be used to provide prediction with respect to user demand. For example, in a tennis tournament, the featured group, $hits_{FeaturedGroup}(.)$ can be exchanged with featured player or team, for a doubles tournament. Similarly, featured holes, $hits_{FeaturedHoles}(.)$ can be exchanged with match or set points, which court, e.g., center court, the match is being played on, etc. Accordingly, one of skill in the art will understand that the expressions below can easily be modified with different demand factors, depending on the type of event, etc.

Figure 6:
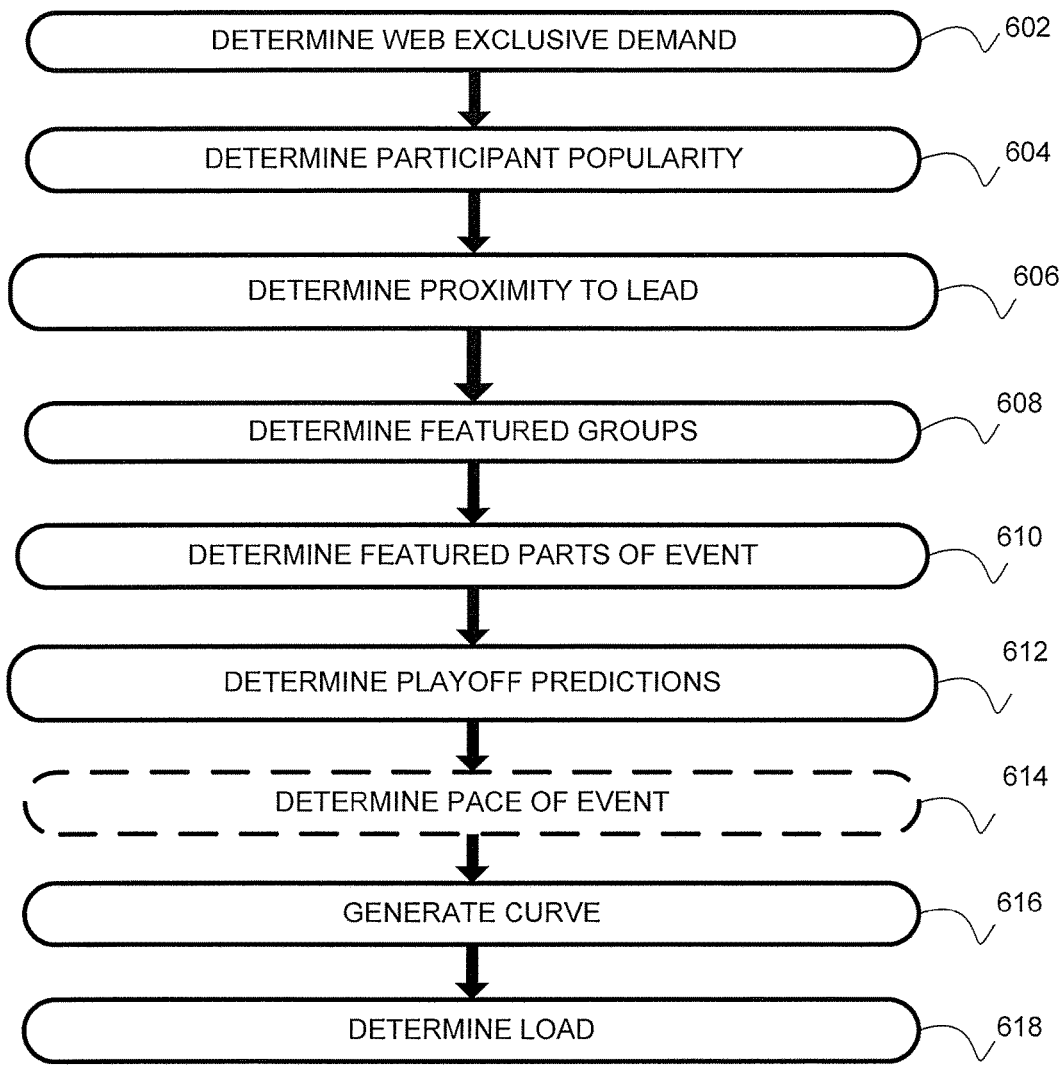
FIGS. 6-8 show example flows in accordance with aspects of the present invention.
Figure 7:
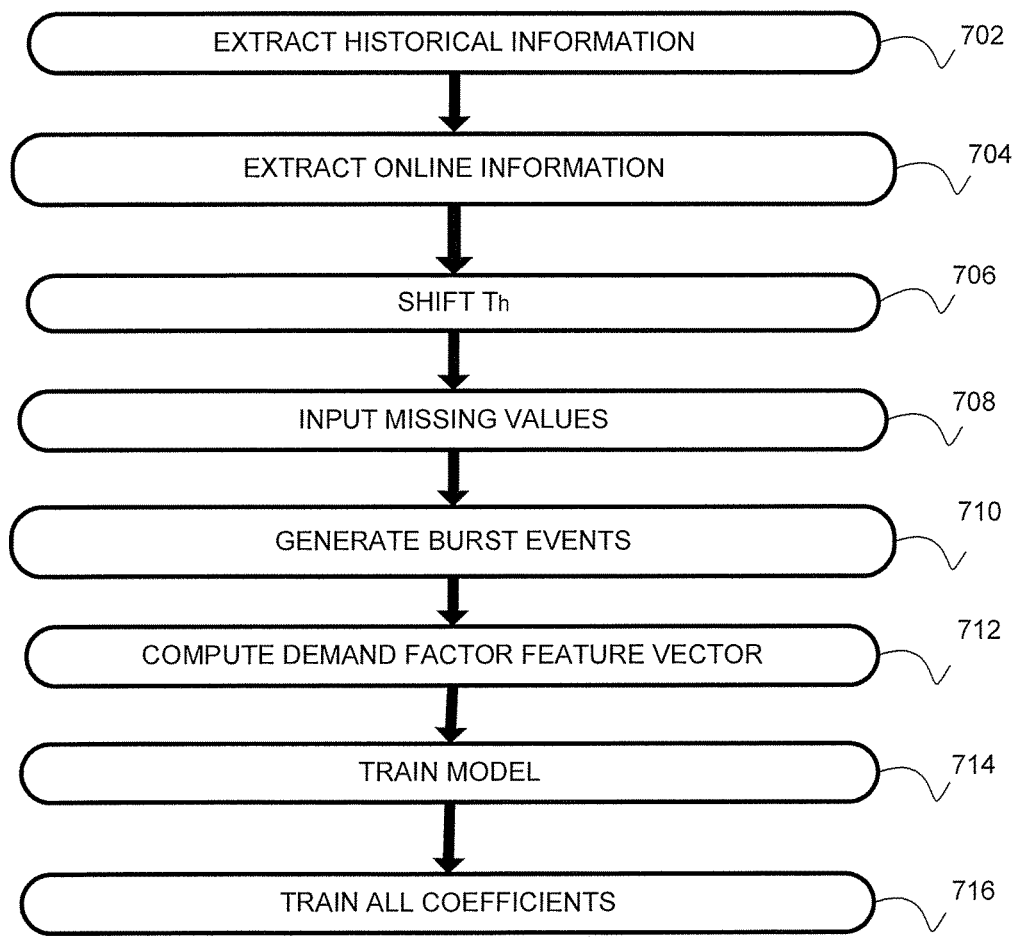
Figure 8:
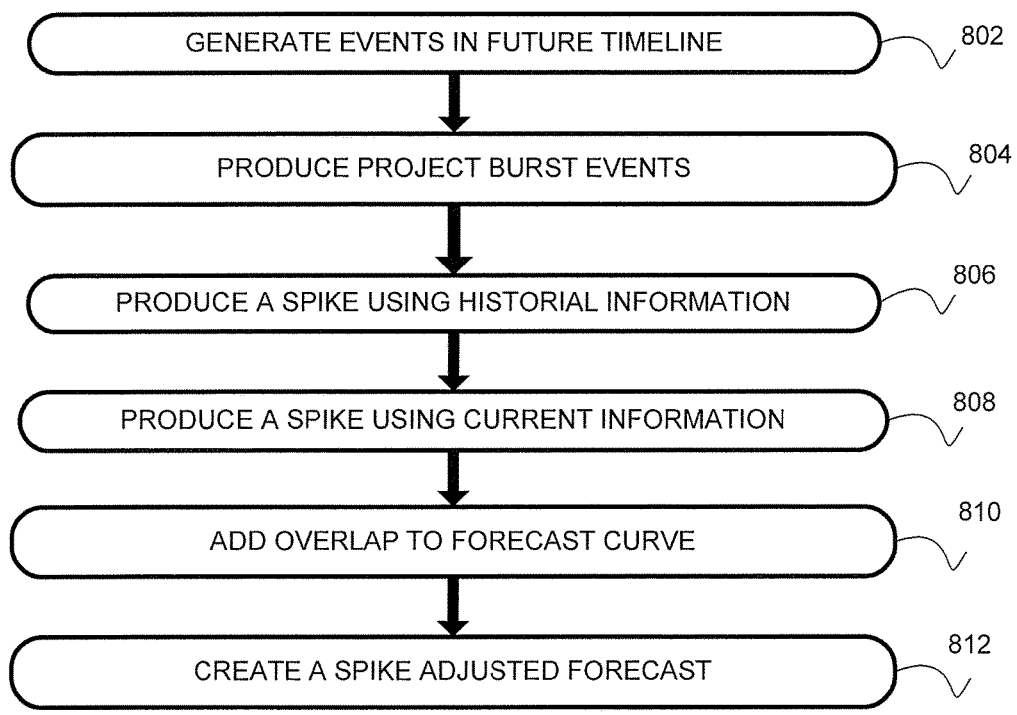

FIGS. 6-8 show example flows for predicting data demands on a computing system in accordance with aspects of the present invention. The steps of FIGS. 6-8 may be implemented in the environment of FIGS. 1-4 for example.

FIGS. 6-8 are described with regard to a specific sporting event, but can be implemented with any event hosted within a cloud environment. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 6 depicts an example flow for predicting future data demands in accordance with aspects of the present invention. In embodiments, FIG. 6 provides one or more steps that can be used to construct a polynomial or other type of mathematical expression that can predict computing resources that will generate a curve that can fit future data demands over a period of time. By way of example, a polynomial can be expression (1) which can use the following demand factors to predict web traffic:

$$\text{Curve}[\text{hits}_{PaceOfPlay}(.)] = \text{hits}_{Lead}(.) + \text{hits}_{FeaturedGroup}(.) + \text{hits}_{FeaturedHoles}(.) + \text{hits}_{WebExclusive}(.) + \text{hits}_{PlayerPopularity}(.) + \text{hits}_{Playoff}(.) \quad (1)$$

Thus, expression (1) is a polynomial used by a demand server to generate a demand curve based on hits, e.g., demand requests of particular types of information from a user, to the demand projection server. As shown, expression (1) uses hits associated with web exclusive demand, featured groups, featured hole (e.g., associated with a golfing event), player popularity, playoffs. While expression (1) includes these particular types of demand (hits), expression (1) can include additional, fewer, and/or other types of demand. For example, expression (1) can include demand/hits associated with proximity to lead associated with consumer's requesting information associated with who is in lead of an event, such as a golf tournament. Also, while expression (1) includes web traffic related to a golf tournament, expression (1) can be also used to predict/forecast data demand for other types of events. For example, in a championship baseball game, expression (1) may include web traffic predictions relating to a pitcher, managers, a particular inning, etc.

At step 602, the demand projection server determines web exclusive demand. In embodiments, the demand projection server determines how much user web traffic volume will change when a web exclusive event occurs. For example, the web exclusive demand can be determined by expression (2):

$$\text{hits}(t, X_{wet}, WET) = f(X_{wet}, t, WET) \quad (2)$$

As shown in expression (2), the hits (i.e., web traffic requests for data) based on web exclusive demand are a function of the time of the sampling event (t), the total number of hits caused by web exclusive events determined by previous information ($X_{wet}$), and web exclusive time periods associated with the event (WET). If the time period is within WET, then $X_{wet}$ is returned; otherwise the sampling event is not considered a web exclusive, described in expression (3):

$$f(X_{wet}, t, WET) = \begin{cases} 0; & t \notin wet \\ X_{wet}; & t \in wet \end{cases} \quad (3)$$

As a result, the total number of hits for a web exclusive coverage event is determined by the function hits(t, $X_{wet}$, WET).

At step 604, the demand projection server determines demand associated with participant popularity. In embodiments, the demand projection server uses information from websites (e.g., social networking websites) to determine a popularity level of a player (e.g., number of times player is mentioned, discussed in message boards, etc.). In embodiments, the demand projection server can use expression (4) and/or expression (5) to determine the popularity of a participant:

$$\text{hits}(CP_x, CP, X_{cp}) = \sum_{x=1}^{|CP|} X_{cp} * (\text{Popularity}(CP_x) / \max(\text{Popularity}(CP))) \quad (4)$$

$$\text{hits}(CP_x, CP, X_{cp}) = X_{cp} \sum_{x=1}^{|CP|} (\text{Popularity}(CP_x) / \max(\text{Popularity}(CP))) \quad (5)$$

As shown in expressions (4) and (5), $CP_x$ is a specific current participant (e.g. a golfer playing in the event), CP are all the current participants, $X_{cp}$ is determined "a priori" (i.e., data received from before the event started) from the most popular player within historical data. Thus, the total number of hits for a participant is determined by the function hits($CP_x$, CP, $X_{cp}$).

At step 606, the demand projection server determines projected web traffic based on proximity to lead. In embodiments, the proximity to lead determines the demand of the event when several participants (e.g., players, competitors, etc.) are within range of the winner's circle. In embodiments, if a round of play has not been completed, scores are predicted from historical information until all participants have achieved crossed a particular event threshold (e.g., all golf players have finished the sixth hole). In embodiments, the demand projection server can use expression (6) to determine the projected web traffic data based on proximity to lead as follows:

$$\text{hits}(P_x, \overline{P}, X_{lead}) = \sum_{x=1}^{|P|} X_{lead} * (\text{Popularity}(P_x) / \max(\text{Popularity}(\overline{P}))) \quad (6)$$

As shown in expression (6), Px is a participant that is close to the lead (e.g., within a determined score—within one point, two points, 5 points, etc., of the leader), and P are all participants that are close to the lead. In embodiments, the demand projection server predicts future scores for all players within an unfinished round by using expression (7):

$$I(P_{irh}) = \begin{cases} P_{irh} == \text{null}; P_{irh} = avg(P_{rh}) \mid P_{irh} = avg(historicalP_{rh}) \\ P_{irh} = P_{irh} \end{cases} \quad (7)$$

As shown in expression (7), $P_{irh}$ is a particular participant's Pi within a round, r, and a hole/other portion, h, of the event, and $P_{rh}$ are the scores of all participants for a particular round, r, and a hole/other portion of the event, h. After all players have finished a part of the event (e.g., 18 scores for a round), the demand projection server determines a sum of all scores for a particular participant using expression (8):

$$S_{ir} = \sum_{k=1}^{18} P_{irh} \qquad (8)$$

Thus, the demand projection server, using expression (8) computes the aggregate score for a particular portion of the event (e.g., a round of golf) given all the player's summed scores in expression (9):

$$S_{agg}(r) = \sum_{i=1}^{N} S_{ir} \qquad (9)$$

Thus, expression (9) includes $S_{agg}(r)$ which is the sum of all scores for all players within a particular round and $S_{ir}$ is a score for a particular player "i" for a particular round "r." As such, the demand projection engine uses expressions (8) and (9) to determine the variance of the scores given the overall projected or real leader score per round and the sum of every player's score for each round:

$$\sigma^2 = \sum_{r=1}^{R} \sum_{i=1}^{N} (S_{agg}(r) - S_{ir})^2 \qquad (10)$$

As shown in expression (10), $\sigma^2$ is the variance of scores (e.g., golf scores, tennis scores, etc.) within a particular round (e.g., round of golf, a set within a tennis match, etc.), $\sigma$ is the standard deviation of scores within a particular round, and R is the total number of rounds.

In embodiments, after the average leader score and the standard deviation have been calculated, the demand server creates a normal curve using expression (11):

$$f(x) = \frac{1}{\sigma\sqrt{2\pi}} e^{-\frac{(x-\mu)^2}{1e^2 \sigma^2}} \qquad (11)$$

Thus, for each of the best scores, the demand projection server, using expression (11) determines the probability of a score which will determine how many standard deviations the player is from the mean. For example, if $2.1\% \geq f(x) > 0.1\%$, then $\sigma=3$, or if $13.6 \geq f(x) > 2.1\%$, then $\sigma=2$, or if $34.1\% \geq f(x) > 13.6\%$, then $\sigma=1$. In embodiments, the demand projection server continues expanding from the highest standard deviation to the lowest until the total number of participants are close to the lead is no more than a threshold value (e.g., 3, 4, 6, etc.), unless a full standard deviation is skipped which may occur if the leader is too far ahead for any other participants to compete.

Thus, Px maintains a list of all players that could compete for the lead, $X_{lead}$ is determined from historical data, and the function popularity (.) is determined by the demand projection server. Thus, all the variables for hit (Px, P, $X_{lead}$) are known and the number of hits associated with participants within the proximity of the lead can be determined.

At step 608, the demand projection server determines data demand associated with featured groups which are participants that have web accessible streaming coverage of the event (e.g., the golf tournament, the tennis tournament, the political event, etc.). In embodiments, the featured group includes players that have been chosen based on their level of popularity with fans (e.g., fan favorites). In embodiments, the featured groups demand is determined by expression (12):

$$\text{hits}(FGP_x, FGP, X_{fg}, W_{wet}) = \qquad (12)$$
$$\sum_{x=1}^{|P|} W_{wet} X_{fg} * (\text{Popularity}(FGP_x) / \max(\text{Popularity}(FGP)))$$

As shown in expression (12), FGP is all the participants within a featured group that can be provided by a third party (e.g., the golf tournament event provider), $FGP_x$ is a particular participant, x, within the featured group and can also be provided by the tournament provider, $W_{wet}$ is a weight for web exclusive at time "t", and $X_{fg}$ is the number of hits for a featured group. In embodiments, the web exclusive weight is calculated "a priori" from historical data; however, if the time period is not web exclusive, "wet," then the weight should be reflexive such that:

$$W_{we} = \begin{cases} 1; t \notin \text{wet} \\ > 1; t \in \text{wet} \end{cases}$$

Furthermore, as shown in expression (12), the functions for popularity (.) are determined by an analytical pipeline and $X_{fg}$ is determined from historical data. As a result, the total number of hits for a featured group is determined by the function hits ($FGP_x$, FGP, $X_{fg}$, $W_{wet}$).

At step 610, the demand projection server can determine projected web traffic associated with featured parts of the event. For example, the featured parts of the event (e.g., the sixth hole within a golf tournament, a quarter within a football game, etc.). Thus, the demand projection server predicts user demand based on that featured part of the event. In embodiments, the demand associated with featured parts of the event can be determined by expression (13):

$$\text{hits}(FHP_x, FHP, X_{fg}, W_{wet}, X_{fg}) = \qquad (13)$$
$$\sum_{x=1}^{|P|} ((W_{wet} X_{fg} * (Pop(FHP_x) / \max(Pop(FHP))) -$$
$$\text{hits}(W_{we}, X_{fg}, FHP_x, FHP))$$

As shown in expression (13), FHP are the players at the featured part of the event, FHPx is a particular player, x, at the featured part of the event, and the Pop( ) is the popularity function.

In embodiments, the web exclusive weight is calculated "a priori" from historical data; however, if the time period is not web exclusive, "wet," then the weight should be reflexive such that:

$$W_{we} = \begin{cases} 1; t \notin \text{wet} \\ > 1; t \in \text{wet} \end{cases}$$

Furthermore, as shown in expression (13), the functions for popularity (.) are determined by an analytical pipeline and $X_{fg}$ and $X_{fi}$ are determined from historical data. As a result, the total number of hits for a featured group is determined by the function hits (FGP$_x$, FGP, $X_{fg}$, $W_{wet}$, $X_{fg}$).

In embodiments, to eliminate any double counting of hits that are correlated to featured groups, the total number of hits due to featured groups is given by expression (14):

$$\text{hits}(W_{we}, X_{fg}, FHP_x, FHP) = W_{we} X_{fg}(\text{Pop}(FHP_x)/\max(\text{pop}(FHP))) \quad (14)$$

At step 612, the demand projection server can determine projected web traffic data associated with playoff predictions. Again, the web exclusive weight is calculated "a priori" from historical data; however, if the time period is not web exclusive, "wet," then the weight should be reflexive such that:

$$W_{we} = \begin{cases} 1; t \notin \text{wet} \\ > 1; t \in \text{wet} \end{cases}$$

A playoff is determined if both current active participants (e.g., those still playing), current participants, those participants who have finished the event, and others (e.g., club house golfers) can generate a score or any other type of result that requires a playoff. For example, within a golf tournament, the playoff may be projected based on the predicted outcome of players still playing, (e.g., in a golf tournament the players ability to shoot an eagle or a double bogey). If a playoff is predicted to occur, then an increased data demand is then projected for that playoff.

In embodiments, during a playoff, a prediction of web traffic is calculated if the remaining amount of the event has reached a threshold (e.g., for a golf tournament the total number of holes and the remaining number of players). If that threshold has been reached, then the demand projection server uses expression (15) to determine the web data traffic of the playoff:

$$\text{hits}_{pi}(P_a, P_f, x_{pl}, t_s, t_c, t_e) = \quad (15)$$

$$\begin{cases} x_{pl}; t_s > t_c > t_e; P_k \in P_a; \left( \sum_{x=1}^{N} \text{range}(P_x) \subseteq \text{winRange}(P_a, P_f) \right) > 1 \\ 0 \end{cases}$$

As shown in expression (15), $x_{pl}$ is the determined number of web traffic hits from historical data, $t_s$ is the finish time (e.g., sunset time for golf), $t_c$ is the current time, $t_e$ is the event end time based on the pace of the event (e.g., pace of play in a tennis or golf game), P$_f$ is a particular player still playing and P$_a$ are all active players. In embodiments, the range of potential winners takes into account those participants who are still playing in the event as well those participants who have finished the event.

Additionally, the range of potential winners takes into account the participating player's scoring ability based on the portion of the event. For example, within a golf tournament the player's ability to score an eagle on the last hole is used to determine if that player could result in a playoff. In embodiments, a winner range function, expression (16), is determined to take into account different participant's scoring capabilities within the event. This example expression (16) is used within a golf event; however, it can be changed to other types of events with other types of scoring events:

$$\text{winRange}(P_a, P_f) = [(\min(\text{club min}(P_f), \text{activemin}(P_a) - 2), \min(\text{club min}(P_f), \text{activemax}(P_a) + 2)] \quad (16)$$

Thus, expression (16) determines for different players whether they are active or finished within the event. If the player is finished, the actual score provides both a low and high score range. If the player is still playing, the player's current score is ranged between the most and least they can score (e.g., in golf the range is from eagle to double bogey). Thus the range is shown in expression (17):

$$\text{range}(P_x) = \begin{cases} [\text{score}(P_x), \text{score}(P_x)]: P_x \in P_f \\ [\text{score}(P_x) - 2, \text{score}(P_x) + 2]: P_x \in P_a \end{cases} \quad (17)$$

Thus, the number of web traffic hits/demand caused by a playoff is determined by hits$_{pl}$(P$_a$, x$_{pl}$, t$_s$, t$_e$, t$_c$).

At step 614, the demand projection server can optionally determine a supplemental pace of play to determine when specific participants will start, finish, or come into and out of live web streaming coverage. In embodiments, the supplemental pace of play can be incorporated into expression (1). In embodiments, expression (18) provides that duration as:

$$\text{duraction}_h(h,r,\alpha,\beta) = \alpha^* \text{history}(h,r) + \beta^* \text{finished}(h,r) + \text{current}_h(h,r) \quad (18)$$

As shown in expression (18), h is a specific portion of an event (e.g., a hole in golf tournament), r is a specific part of the event that can include portions "h", $\alpha$ is the percentage of players that have completed a specific portion of the event within a specific part of the event, $\beta$ is a determined weight for those specific portions of the event that have been completed, history (h,r) is the duration of a specific part of the event within a specific portion of the event from historical data, finished (h,r) is the duration of a specific part of the event within a specific portion of the event from current data, current$_h$(h,r) provides the duration of a specific part of an event within a portion of the event, that is currently being played, from historical data. If there is no historical data, then a default value can be used. As a result, the pace of play for each hole can be determined with duration$_h$(h, r, $\alpha$, $\beta$).

At step 616, the demand projection server takes the projected data demands from the different characteristics of an event, described in steps 602-614, and generates a demand curve, using expression (1), that can be used to project data demands over a period of time.

At step 618, the demand projection server uses the curve to determine a load. In embodiments, the load can be an amount of computing resources (e.g., amount of memory) that are required to meet the projected data demands. In embodiments, the load can be determined with expression (19):

$$PS(t_r, t_p, \text{Curve}[\text{hits}_{PaceOfPlay}(.)]) = \quad (19)$$

$$\begin{cases} \text{ceil}\left( \frac{1}{x_{hsl}} * \text{Curve}[\text{hits}_{PaceOfPlay}(.)] \right): t_p - t_r \geq 90 \text{ min} \\ \text{ceil}\left( \frac{1}{x_{hsz}} * \text{Curve}[\text{hits}_{PaceOfPlay}(.)] \right): t_p - t_r < 90 \text{ min} \end{cases}$$

Thus, expression (19) projects a demand, at a step in time, onto a number of servers that are provisioned to be able to satisfy future server loads for the projected web traffic. The number of hits/demand can be determined before the event starts, and thus, a total number of provisioned servers are calculated for the event. As shown in expression (19), $t_r$ is the real event time, $t_p$ is the predicted event time, Curve $[\text{hits}_{paceorplay}(.)]$ is the total number of predicted traffic hits at a given tournament time, $x_{hsl}$ is the number of hits per stateful servers to provision if the difference between the predicted time and tournament time is greater or equal to 90 minutes or any other time, $x_{hss}$ is the total number of hits per statelite server to be provisioned if the difference between the predicted time and the tournament time is less than 90 minutes or any other time, and ceil(.) indicates that expression (19) is rounded up to any non-integer value (e.g., 2.3 is rounded up to 3).

In further embodiments, demand weights can be calculated as scalars for demand factors. For example, the weights adjust demand factor contribution to the overall demand prediction given the current state of play within the tournament. By way of specific, non-limiting example, weights can include, amongst others:

(i) Social Golf Player Popularity Weight is determined from by social sentiment analysis of Twitter feeds during game play; and/or Web Exclusive Weight provides the importance of web only access relative to featured hole and player group.

The forecasted demand during tournament play also includes a time component. The time component is predicted during game play with a time factor, e.g., Pace of Play combines time averages of a round and hole from historical, current, default, and finished data. In an example, the timing estimates are combined into a Predicted Schedule of Play.

The following exemplary Table 1 depicts priorities and dependencies for factors and weights.

TABLE 1

| Factors | Priority | Weight Dependencies |
| --- | --- | --- |
| Web Exclusive | 1 | None |
| Proximity to Lead | 2 | Social Golf Player Popularity |
| Featured Groups | 3 | Social Golf Player Popularity, Web Exclusive |
| Featured Holes | 4 | Social Golf Player Popularity, Web Exclusive |
| Playoff Prediction | 5 | None |
| Player Popularity | 6 | Social Golf Player Popularity |
| Pace of Play | 1 | None |

FIG. 7 depicts an example flow to train an event forecast model in accordance with aspects of the present invention. In embodiments, a demand projection server trains an event forecast model, such as a linear regression model which is trained with historical information by using a regularized stochastic gradient decent. In embodiments, the demand server defines a prior event $\{T_h, T_o\}$.

At step 702, the demand projection server extracts historical training set, $T_h$ for a previous event. In embodiments, the historical training set can be any information relating to any of the characteristics of an event (e.g., playoff predictions, proximity to lead, etc.) as described in FIG. 6. At step 704, the demand projection server extracts online training set $T_o$ for the current event. In embodiments, the current online training set can be any information relating to any of the characteristics of an event (e.g., playoff predictions, proximity to lead, etc.) as described in FIG. 6.

At step 706, the demand projection server shifts $T_h$ to be contiguous with $T_o$. For example, $T_h$ is associated with historical information from 1985 to 1990 and $T_o$ is beginning in 2013. Thus, the demand projection server changes the timeline of the historical information to 2008 to 2013 so that is a contiguous set of information for $T_h$ and $T_o$. At step 708, the demand projection server inputs any missing values from I ($T_h$ that intersects $T_o$) to produce $T_f$. For example, if there are values that are not provided for any portion of the training set, then the demand projection server can generate that missing portion (e.g., by extrapolation).

At step 710, the demand projection server generates burst events $E_b$ from $T_h$. For example, the demand projection server determines different burst events based on one or more of the characteristics (e.g., proximity to lead, playoff predictions, etc.) described in FIG. 6. At step 712, the demand projection server determines a demand factor feature vector, d for each event e being a subset of $E_b$. Thus, the demand feature vector takes into account all the different burst events to determine a total demand load based on those different burst events.

At step 714, the demand projection server trains a linear regression model d with the number of coefficients equal to a magnitude value for the demand factor feature vector. Thus, the demand projection server may have required a particular outcome; and, as such, the model is trained to provide that particular outcome. At step 716, the demand server trains all coefficients by using the regularized stochastic gradient descent to yield $f_e(d)$ given a target variable y. Thus, the demand projection server implements a regularization process to reduce outfitting, e.g., a level of error that is resulting in an incorrect outcome.

FIG. 8 depicts a flow for applying an event forecast model in accordance with aspects of the present invention. In embodiments, the demand projection server applies the model by defining the period of analysis as $\{f_e(d), i_{start}, t_{end}\}$. At step 802, the demand projection server generates events in a future timeline. Thus, the demand projection server determines the timeline associated with determining data demand (e.g., the beginning to end of an event, a portion of the event, etc.). At step 804, the demand projection server generates predicted burst events based on historical information. Thus, during the timeline, the demand projection server simulates the projected burst events.

At step 806, the demand projection server generates a predicted spike in demand based on the burst events using the historical information. Thus, for each event (e) that is a subset of $E_b$ (the burst event), the demand projection server produces a spike that is a function of the demand factor feature vector "d."

At 808, the demand projection server produces a spike in demand based on current information, S(t). Thus, for each minute of time, $t_{min}$ that is within the range of the future timeline $[t_{start}, t_{end}]$, a predicted spike for that minute (or any other period of time) is determined as a function of the demand factor feature vector "d."

At step 810, the demand projection server adds overlap to the forecast curve. In embodiments, the overlap is difference between the spike based on current information and historical information. Thus, the overlap is added to a forecast curve that may be associated with forecasting maximum values, minimum values, average values, etc., for that future timeline. At step 812, the demand projection server creates a spike adjusted forecast. In embodiments, the spike adjusted forecast, $F_{adj}$, is the summation of S(t) and F(t) which provided the projected demand and is used to determine the load, described in FIG. 6. In embodiments, $F_{adj}$ can be equal to the result of expression (1). Thus, $F_{adj}$ is then is used (e.g., in expression (19) described above) to determine the load and, as such, the number of servers needed to meet the forecasted web traffic data.

Thus, the linear regression model is trained and applied to a future time horizon to produce a spike curve from predicted burst events. As such, a simulator/modeling application stored by the demand server can be used to simulate a tournament into the future for the production of all burst events by using a spike adjusted forecast as shown in curve 306 in FIG. 5.

In embodiments, the invention provides a method that performs the process of the invention on a subscription, advertising, and/or fee basis. That is, a service provider, such as a Solution Integrator, could offer to provide network demand forecasting functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for network demand forecasting. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving one or more variables associated with an event;
generating, by at least one computing device, a model to forecast future demand based on the one or more variables;
determining, by the at least one computing device, a load to provision one or more cloud servers to meet the future demand, wherein the load is based on the model;
physically provisioning the one or more cloud servers with the determined load based on a trained model which includes a forecasted further demand with a threshold level of error to increase forecasting accuracy during the event; and
automatically allocating additional cloud computing resources to meet the forecasted future demand ahead of a time of the event to prevent an unsustainable volume of web traffic,
wherein the one or more variables are associated with the web traffic associated with at least one of proximity to lead or playoff predictions,
the proximity to lead is based on projecting the web traffic associated with particular participants being within a threshold level of being in first place in the event, and
the model is trained so that the future demand is forecasted with the threshold level of error, and the training of the model includes generating a burst event based on a historical training set and an online training set, and the burst event is used to compute a demand factor feature vector which is used to train the model using a number of coefficients equal to the magnitude value of the demand factor feature vector.

2. The method of claim 1, wherein an error rate associated with the model forecasting the future demand is reduced by training the model with different values associated with the one or more variables.

3. The method of claim 2, wherein the training includes determining a pattern associated with the forecasting the future demand.

4. The method of claim 1, wherein the future demand is associated with cyclic demand and demand spikes over a period of time, and the load is based on at least one of memory, disk space, and processor units.

5. The method of claim 1, wherein the one or more variables are associated with the web traffic further associated with:
web exclusive demand;
participant popularity; and
featured groups.

6. The method of claim 5, wherein the web traffic associated with participant popularity is based on obtaining data from one or more social networking websites which mention a participant's name.

7. The method of claim 5, wherein the web traffic associated with the playoff predictions is based on projecting web traffic for a predicted playoff based on analyzing different participants and their scoring capabilities within the event.

8. The method of claim 5, wherein the web traffic associated with the web exclusive demand is based on projected web traffic for content that is only available on the Internet.

9. The method of claim 5, wherein the featured groups is based on projected web traffic associated with participants who are provided web accessible streaming coverage during the event.

10. The method of claim 1, wherein a service provider at least one of creates, maintains, deploys and supports a computer infrastructure which comprises the at least one computing device.

11. The method of claim 1, wherein spikes of demand associated with the future demand are determined by using online information.

12. The method of claim 1, wherein steps of claim 1 are provided by a service provider on a subscription, advertising, and/or fee basis.

13. The method of claim 11, wherein the spikes of demand are bursts of demand that occur intermittingly over a period of time.

14. The method of claim 13, further comprising adding overlap to a forecast curve based on at least one of a forecast of a maximum value, a forecast of a minimum value, and a forecast of an average value, and the overlap being a difference between the spikes of demand based on current information and historical information.

15. The method of claim 1, further comprising:
generating at least one event in a future timeline;
generating at least one predicted burst event based on a historical timeline of a previous event which is similar to the at least one event;
generating a predicted spike in demand based on the at least one predicted burst event using the historical timeline;
generating a spike in demand based on a current timeline;
adding overlap to a forecast curve which is a difference between the predicted spike in demand based on historical information and the spike in demand based on the current timeline;
generating a spike adjusted forecast based on the generated predicted spike in demand, the generated spike in demand, and the overlap; and
determining a load based on the generated spike adjusted forecast.

16. A computer program product for predicting demand in a cloud environment, the computer program product comprising a computer usable storage medium having program code embodied in the storage medium, the program code being readable/executable by a computing device to:
receive one or more variables associated with an event;
generate a model to forecast future demand based on the one or more variables being associated with spikes of demand over a period of time;
determine a load based on the model, wherein the load is used to provision one or more cloud servers to meet the future demand;
physically provision the one or more cloud servers with the determined load based on a trained model which includes a burst event to increase forecasting accuracy during the event; and
automatically allocate additional cloud computing resources to meet the future demand ahead of a time of the event to prevent an unsustainable volume of web traffic,
wherein the model is trained so that the future demand is forecasted with a threshold level of error, and
the training of the model includes generating the burst event based on a historical training set and an online training set, and the burst event is used to compute a demand factor feature vector which is used to train the model using a number of coefficients with a regularized stochastic gradient descent, the number of coefficients being equal to the magnitude value of the demand factor feature vector.

17. The computer program product of claim 16, wherein the model is based on a vector that incorporates data demand predictions for the one or more variables.

18. The computer program product of claim 16, wherein the spikes of demand are adjusted by implementing a forecast curve based on at least one of a forecast of a maximum value, a forecast of a minimum value, and a forecast of an average value.

19. The computer program product of claim 18, wherein the spikes of demand use historical and online periods of information.

20. A system comprising:
a CPU, a computer readable memory and a computer readable storage medium;
program instructions to receive one or more variables associated with an event, wherein the one or variables are associated with data demand for playoff predictions;
program instructions to generate a model to forecast future demand based on the one or more variables being associated with spikes of demand over a period of time, wherein the model uses a demand factor feature vector; and
program instructions to determine a load based on the model, wherein the load is used to provision one or more cloud servers to meet the future demand,
wherein the program instructions are stored on the computer readable storage medium for execution by the CPU via the computer readable memory,
a web traffic associated with the playoff predictions is based on projecting web traffic for a predicted playoff based on analyzing different participants and their scoring capabilities within the event,
physically provision the one or more cloud servers with the determined load based on the generated model which includes a forecasted future demand to increase forecasting accuracy during the event,
automatically allocate additional cloud computing resources to meet the future demand ahead of a time of the event to prevent an unsustainable volume of the web traffic, and
the additional cloud computing resources comprise the one or more cloud servers, at least one processor, and at least one memory device.

* * * * *